United States Patent
Pirro et al.

(10) Patent No.: US 8,834,078 B2
(45) Date of Patent: Sep. 16, 2014

(54) NOZZLE METHOD FOR REMOVING DUST AND CHIPS RESULTING FROM DRILLING OPERATIONS

(75) Inventors: Nicola Pirro, Troia (IT); Giancosimo Digiaro, Giovinazzo (IT)

(73) Assignee: Alenia Aermacchi S.p.A., Venegono Superiore, Varese (IT)

( * ) Notice: Subject to any disclaimer, the term of this patent is extended or adjusted under 35 U.S.C. 154(b) by 289 days.

(21) Appl. No.: 13/488,917

(22) Filed: Jun. 5, 2012

(65) Prior Publication Data

US 2012/0315100 A1 Dec. 13, 2012

(30) Foreign Application Priority Data

Jun. 7, 2011 (IT) .............................. TO2011A0492

(51) Int. Cl.
*B23Q 11/00* (2006.01)
*B23B 49/02* (2006.01)

(52) U.S. Cl.
CPC .......... *B23Q 11/0046* (2013.01); *B23B 49/023* (2013.01)
USPC ............ 408/1 R; 408/67; 408/97; 408/115 R

(58) Field of Classification Search
USPC .......... 408/67, 72 B, 72 R, 76, 95, 97, 115 R; 15/339, 415.1
See application file for complete search history.

(56) References Cited

U.S. PATENT DOCUMENTS

| 5,033,917 A * | 7/1991 | McGlasson et al. ............. 408/67 |
| 2003/0049085 A1* | 3/2003 | Pettersson et al. ............. 409/132 |
| 2008/0050193 A1 | 2/2008 | Gamboa et al. |
| 2009/0214307 A1* | 8/2009 | Nguyen .......................... 408/56 |

FOREIGN PATENT DOCUMENTS

| DE | 203 01 080 U1 | 3/2003 | |
| DE | 20 2007 002845 U1 | 6/2007 | |
| EP | 1570947 A2 * | 9/2005 | ............ B23Q 11/00 |
| WO | WO 2006088404 A1 * | 8/2006 | ............ B23B 49/02 |
| WO | WO 2008/027001 A1 | 3/2008 | |

OTHER PUBLICATIONS

Extended European Search Report for corresponding European Patent Application No. 12170966.1 mailed Sep. 26, 2012.
Italian Search Report for corresponding Italian Patent Application No. TO2011A000492 mailed Jan. 26, 2012.

* cited by examiner

*Primary Examiner* — Daniel Howell
*Assistant Examiner* — Michael Vitale
(74) *Attorney, Agent, or Firm* — Merchant & Gould P.C.

(57) ABSTRACT

A nozzle removes by suction dust and chips from a drilling machine in an industrial plant. The nozzle has a first tubular portion for connection to a suction tube communicating with an opposite second tubular portion with an intake opening. An outer flange extends transversely from an intermediate position between the first and second tubular portions. The intake opening is directed in a lateral direction, parallel to the transverse direction of the flange. A magnetic element is incorporated in the flange. The nozzle can be applied to a drilling template having cylindrical through-openings in which respective bushings made of ferromagnetic material are fixed. When the second tubular portion is inserted through a cylindrical bushing, the magnetic element acts on the bushing, opposing axial and rotational movements of the nozzle.

10 Claims, 2 Drawing Sheets

NOZZLE METHOD FOR REMOVING DUST AND CHIPS RESULTING FROM DRILLING OPERATIONS

BACKGROUND OF THE INVENTION

The present invention relates to a suction spout or nozzle suitable for connection to equipment for drilling carbon-fiber reinforced resin and/or titanium or alluminum plates. The invention is applicable to industrial installations for removing dust by means of suction, in particular, but not exclusively, in the aircraft manufacturing field.

According to the prior art, in order to form holes in plates and parts made of carbon-fiber reinforced resin, the boring machine tools (drills) are associated with drilling templates consisting of plates in which multiple through-openings are formed. These openings define predetermined locations wherein the holes are to be formed through one or more carbon-fiber reinforced resin plates, which may be arranged on top of each other.

In the aircraft construction sector, for example for the construction of large-size structural parts such as stabilizers, on occasions it is required to provide a plurality of holes in plates arranged horizontally, by operating from below. From this position, which is uncomfortable from an ergonomic point of view, the operator is conventionally obliged to operate the drilling from below and at the same time must manually hold a pipe for suction and removal of the dust and chips which are produced by drilling. The presence of a second operator who assists the first operator may be required in order to hold the suction pipe.

SUMMARY OF THE INVENTION

The object of the invention is to overcome the above mentioned drawback, optimizing and making as efficient and as easy as possible the operations of removing the dust and chips resulting from drilling, with a suction system.

BRIEF DESCRIPTION OF THE DRAWINGS

The features and advantages of the invention will become clear from the following detailed description of an exemplary embodiment thereof with reference to the accompanying drawings provided by way of a non-limiting example, in which.

DETAILED DESCRIPTION OF THE PREFERRED EMBODIMENTS

Figure 1:
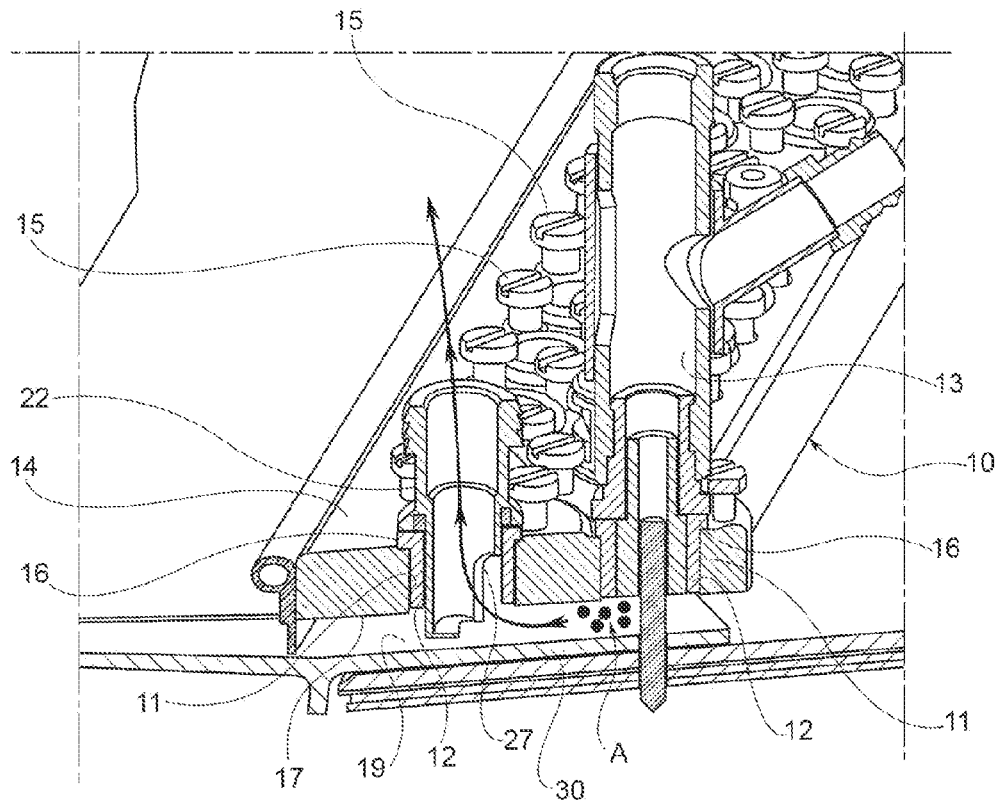
FIG. 1 is a partially cross-sectioned isometric view, which shows a step of a method for drilling and removing the dust with the suction system, in which a nozzle or magnetic spout system is used.
Figure 2:
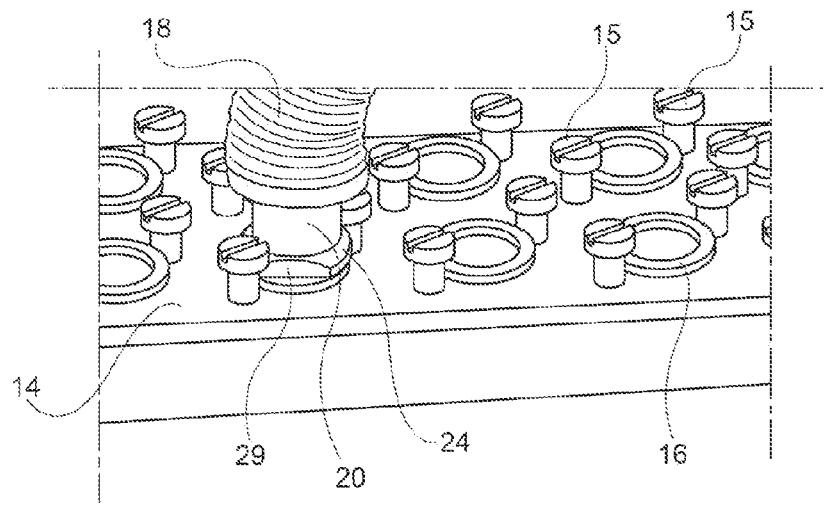
FIG. 2 is an isometric view of a drilling template in which a suction spout connected to a hose for removal of the dust and chips, resulting from the drilling operation, is applied.
Figure 3:
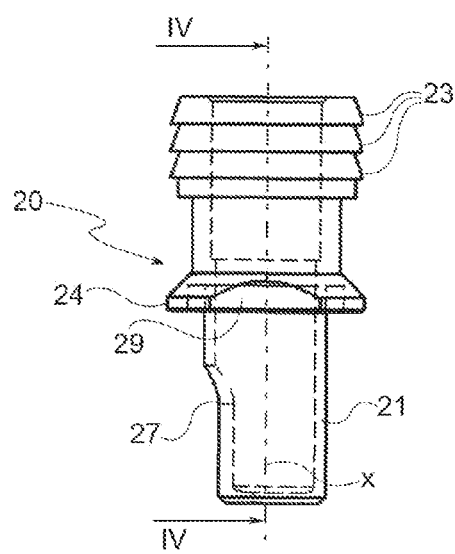
FIG. 3 is a front view of a spout or nozzle according to an embodiment of the invention.
Figure 4:
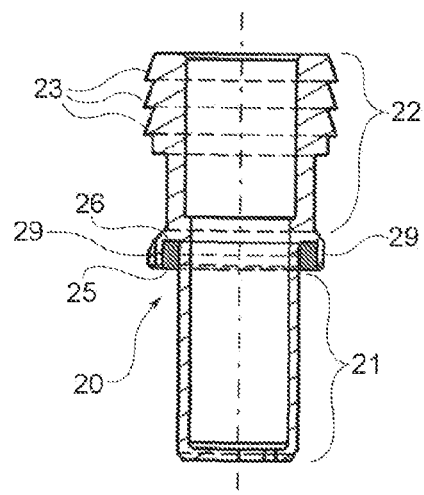
FIG. 4 is a cross-sectional view along the line IV-IV of FIG. 3.

Initially referring to FIGS. 1 and 2, the number 10 designates a drilling template (or drilling jig) in which a plurality of cylindrical through-openings 11 are formed. A cylindrical bushing 12 made of iron or steel is fixed inside each opening 11 and is the seat for a stable and precise drilling device 13 in a position axially aligned with the axis of the bushing 12 and the opening 11. Two screws 15 are fixed close to each bushing 12, on the drilling template surface 14 situated on the side where the drilling machine is applied, i.e. on the surface called in this document the "accessible" surface of the template. The screws 15, which are positioned in a diametrical opposite position respect to the edges of the bushing and project out of the surface 14, are used to fixed the drilling machine for as long as drilling is performed in the same position of the bushing. Each bushing has a flange 16, which is on the accessible surface 14 of the drilling template 10. Both the drilling machine and the drilling template shown in FIGS. 1 and 2 are known in the art and therefore are not described here in greater detail. In the remainder description, only the elements of specific interest for the purposes of implementing the invention will be described. For the design of the parts and elements not shown or described in detail reference may be made to any industrial drilling system of the known type.

The bushings 12, in addition to acting as seats for the drilling motor, are also used as seats for positioning a suction nozzle 20 which can be connected to a suction apparatus or system (not shown) for removing the chips and dust which are produced during the drilling operation.

In the preferred embodiment, the nozzle 20 has an overall tubular cylindrical shape with a straight axis and includes a terminal portion 21 with a tubular cylindrical wall, which is inserted through the bushing 12 so as to project beyond the opposite surface or side 17, referred to herein as "non-accessible" side, of the drilling template 10. Considering the direction of the suction flow of the nozzle, in this context the terminal portion 21 is also called "upstream" portion, while the opposite end portion of the nozzle, denoted by the reference number 22, is called "downstream" end portion.

In the operating condition, the portion 22 of the nozzle arranged downstream projects beyond the surface 14 (or "accessible" side) of the template. The portion 22 with a tubular cylindrical shape has externally a series of annular fishbone reliefs 23 for connection to a suction tube or hose 18 of the plant suction system (FIG. 2) leading to the fixed suction system (not shown).

Externally, about halfway along its length, the nozzle 20 in the example shown has a flange 24 which projects in a radially external direction and is intended to bear against the accessible surface 14 of the drilling template. The bearing surface of the flange 24 ensures that, in the operating position, the end of the nozzle which projects beyond the non-accessible surface 17 of the template is situated at a suitable distance both from the non-accessible surface 17 of the template and from the facing surface 19 of the plate 30 which is being drilled, in order to suck up in an optimum manner the dust and chips produced by drilling.

The nozzle 20 incorporates a permanent magnet 25, in this example with an annular shape, which allows the nozzle to be engaged and retained in a stable and removable manner upon the ferromagnetic bushing 12, in the condition where the flange 24 bears against the outer surface 14 of the drilling template. It will be noted that, when the nozzle is in the assembled condition on the drilling template (FIG. 1), the magnet 25 is in contact with the bushing 12, in particular with the flange 16 therefore.

In the embodiment shown, the annular magnet 25 is fixed inside a corresponding annular circular groove 26 which is formed in the flange 24. The locking or retaining action produced by the magnet 25 has the function of both preventing removal of the nozzle from the template in the axial direction (i.e. away from the drilling template) and maintaining the angular orientation of the nozzle in a plane parallel to the main surfaces 14, 17 of the drilling template. In other words, the magnet 25 keeps the nozzle in the chosen angular position around the axis of the bush. The capacity of the nozzle to assume and maintain a given angular orientation is important for directing the suction flow towards the drilling zone (indicated by A in FIG. 1) where the chips and dust to be removed by suction are produced.

A through-opening or through-slot 27 extends over a given angular section or segment of the terminal portion with tubular cylindrical wall 21, thus defining the preferred radial direction in which suction of the chips and the dust is performed. In the particular embodiment shown, the slot extends as far as the free end of the portion 21. In order to reduce the noisiness of the suction flow, the contour of the slot is rounded and without corners.

Figure 5:
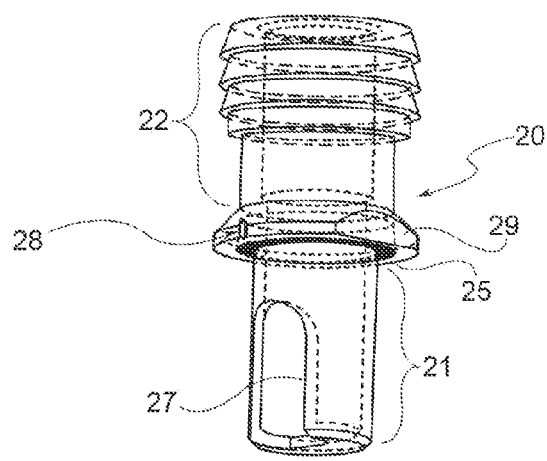
FIG. 5 is a schematic, perspective, partly cut-away view of the spout according to FIGS. 3 and 4.

In the preferred embodiment, the nozzle has a visible reference mark, for example a notch or relief 28 (or other mark) situated on the outside of the nozzle, opposite the slot, i.e. in a position axially aligned with the slot 27. This visible reference mark, shown in FIG. 5, is located on a part of the nozzle arranged "downstream", i.e. intended to remain in the environment where the operator is situated and allows the latter to know and if necessary to adjust the angular orientation of the slot and therefore of suction, directing it towards the position of the drilling machine or in any case the zone where drilling is performed. The advantage of this is that that operator does not need to remove every time the nozzle from the drilling template in order to find out exactly the orientation of the suction slot 27.

In order to apply more easily the nozzle 20 onto the drilling template, the flange 24 has preferably two opposite, smaller-width, lateral segments or zones 29. In the embodiment shown in the drawings, the smaller-width zones 29 consist of two parallel lateral flattened surfaces lying in planes formed parallel and opposite to the central longitudinal axis x of the nozzle 20. Owing to the flattened surfaces 29, the nozzle may be inserted correctly through the bushing 12, bringing the magnet 25 into contact against the bushing 12 without the flange 24 of the nozzle interfering with the heads of the screws 15. In other words, it is not required to disassemble before by hand the screws 15 in order to apply the nozzle into the drilling template. As an alternative to the flattened surfaces 29 the flanges 24 may be designed differently, for example with zones radially projecting by a different amount around the nozzle, so as to define flange zones which have a width smaller than the minimum distance between the heads of two screws situated close to the same bush. For example, the opposite smaller-width lateral zones may be defined by opposite curved convex surfaces.

As can be understood, the invention makes advantageous the use of the bushing already provided in the conventional drilling templates in order to receive the boring devices (drilling motor) using them as seats for the suction spouts. Conveniently the ferromagnetic property of the bushings (made of iron or steel or in any case another ferromagnetic material) is exploited in order to retain in a sufficiently stable manner the nozzle on the drilling template, both as regards the distance separating the nozzle from the template and as regards any angular displacements thereof.

Although an example of embodiment has been illustrated in the above detailed description, it should be noted that a large number of variants exist. It may also be understood that the embodiment illustrated constitutes just one example and is not to be regarded as limiting in any way the scope, applicability or configuration. For example, the nozzle may have a slightly inwardly curved shape instead of a shape with a straight axis as in the example illustrated. The drawings and the detailed description provided above, instead, will provide persons skilled in the art with a convenient guide for implementing the invention, it being understood that various modifications may be made to the functions and configuration of the parts described in the example of embodiment, without departing from the scope of the invention as defined in the accompanying claims and their legal equivalents.

What is claimed is:

1. A nozzle for removing by a suction system dust and chips resulting from a drilling apparatus in an industrial plant, the nozzle comprising:
   two opposite end portions communicating with one another: a first tubular portion suitable for connection to a tube connected to a suction system, and a second tubular portion having an intake opening;
   an outer flange extending transversely from an intermediate position between the first tubular portion and the second tubular portion, the intake opening being directed in a lateral direction parallel or substantially parallel to the transverse direction of the flange;
   at least one magnetic element incorporated in the nozzle; the nozzle being applicable to a drilling template having a plurality of cylindrical through-openings in which respective cylindrical bushes made of ferromagnetic material are fixed, so that when the second tubular portion is inserted through a cylindrical bushing, the magnetic element acts magnetically on the bushing, opposing axial and rotational movements of the nozzle with respect to the template.

2. The nozzle of claim 1, wherein the magnetic element is associated with the flange.

3. The nozzle of claim 2, wherein the magnetic element is an annular magnetic element mounted in a corresponding annular groove formed in the flange.

4. The nozzle of claim 1, wherein:
   the nozzle has overall a cylindrical tubular shape with a straight central axis;
   the intake opening is a side opening which is formed through a free end portion of the second tubular portion and which opens out in a direction transverse to the central axis.

5. The nozzle of claim 1, wherein the first tubular portion has externally a plurality of reliefs for engagement with the tube which leads to the suction system.

6. The nozzle of claim 1, comprising a visible reference mark provided on an outer surface of the nozzle, at an angular position corresponding to the lateral direction in which the intake opening is directed.

7. The nozzle of claim 6, wherein the reference mark is located on an outer surface of the flange.

8. The nozzle of claim 1, wherein the flange has two diametrically opposite peripheral zones in the form of recesses or flattened surfaces.

9. A method for removing by suction dust and chips resulting from a drilling operation in an industrial plant, the method comprising the steps of:
   providing a drilling device;
   providing one or more plates to be drilled;
   providing a drilling template having a plurality of cylindrical through-openings in which respective cylindrical bushings made of ferromagnetic material are fixed, said bushings defining a respective plurality of drilling locations, the template having a first face facing and spaced from said plates to be drilled and a second opposite face on which the bushings emerge;

providing a suction nozzle comprising:
- two opposite end portions communicating with one another: a first tubular portion connected to a hose which is connected to a suction system, and a second tubular portion which has an intake opening;
- an outer flange extending transversely from an intermediate position between the first tubular portion and the second tubular portion, the intake opening being directed in a lateral direction parallel or substantially parallel to the transverse direction of the flange; and
- at least one magnetic element incorporated in the nozzle;

introducing the drill through a first one of the bushings;

applying the nozzle onto the template, introducing the second tubular portion of the nozzle through a second bushing adjacent to the first bushing, bringing the magnetic element into contact with the second bushing;

orienting the nozzle in the second bushing so as to direct the intake opening towards the zone of the first bushing;

drilling a hole in the plate or plates by the drill and sucking through the nozzle the dust and chips resulting from the drilling operation.

10. The method of claim 9, wherein the second tubular portion of the nozzle is inserted into the template in such a way that the intake opening protrudes beyond the first face of the template.

\* \* \* \* \*